Feb. 24, 1970   H. N. STAATS ET AL   3,496,817
SHEET TRIMMING APPARATUS AND METHOD

Filed May 12, 1967   2 Sheets-Sheet 1

INVENTORS
Henry N. Staats
Donald P. Vincent
Neal J. Morrissey

BY Hill, Sherman, Meroni, Gross & Simpson
ATTORNEYS

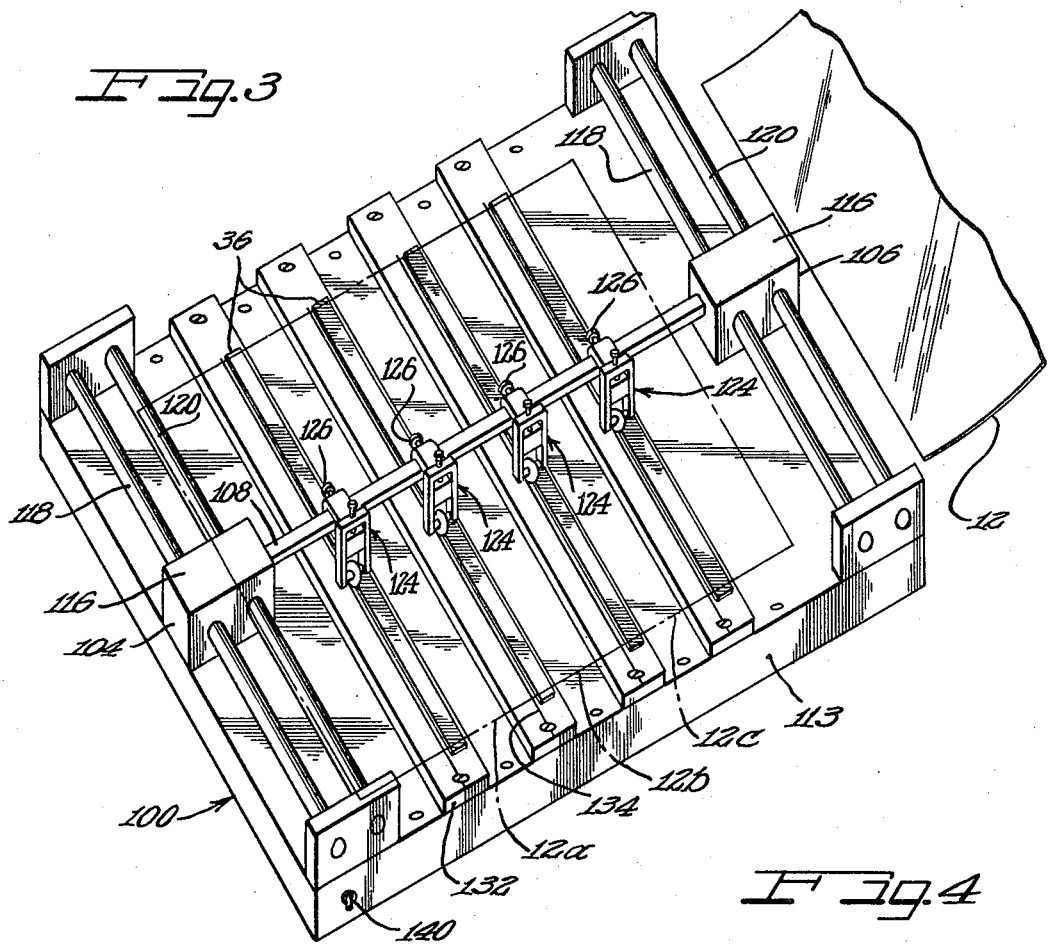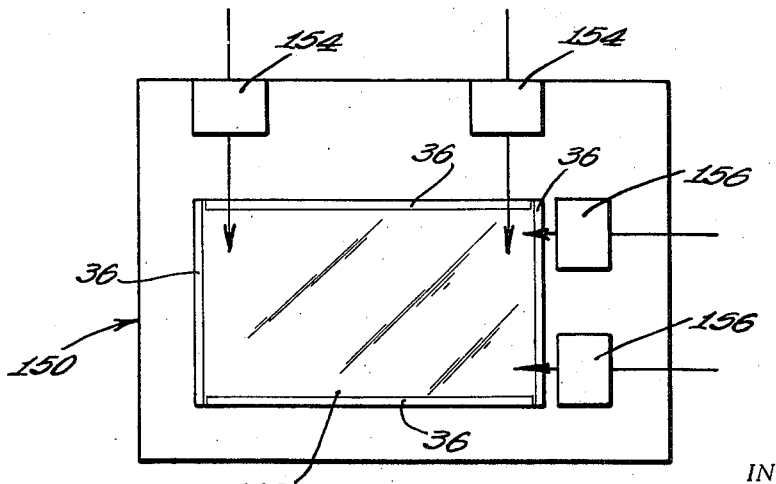

United States Patent Office 3,496,817
Patented Feb. 24, 1970

3,496,817
SHEET TRIMMING APPARATUS AND METHOD
Henry N. Staats, Deerfield, Donald P. Vincent, Wheeling, and Neal J. Morrissey, Chicago, Ill., assignors to General Binding Corporation, Northbrook, Ill., a corporation of Delaware
Filed May 12, 1967, Ser. No. 638,027
Int. Cl. B26d 1/18
U.S. Cl. 83—56                                   10 Claims

ABSTRACT OF THE DISCLOSURE

A trimming apparatus for a smooth sheet material having a hardened cutter wheel adapted to track in a groove of a hardened plate to trim a sheet material disposed therebetween, a tacky double surface tape disposed adjacent the groove to secure one end of the sheet material while it is being trimmed and a polynoid drive for moving the cutter wheel. Alternative embodiments of the trimming apparatus have cutter assemblies for simultaneous and successive operation on the sheet material.

FIELD OF THE INVENTION

The present invention relates to a trimming apparatus and is more particularly concerned with the provision of a novel, substantially simplified form of trimming apparatus utilizing a cutter wheel and a "tacky" double surfaced tape.

PRIOR ART

It is known in the process of manufacturing laminated sheet products to trim the excess film from the periphery of the product. Usually trimming is performed by razor, scissors, cutting boards utilizing straight slicing blades, or rotating sheer cutting wheels.

These techniques leave much to be desired since they are awkward, inaccurate and slow. In timing tests of these prior art methods, it has been noted that they require about 7.5 seconds per trim or 30 seconds for a four-sided piece of paper or film. This means that an operator can only trim two pieces of film per minute or less than half the outlet of a typical office laminator, such as the General Binding Corporation Model 9–LD. This machine operates at 4.6 lineal feet per minute which is equivalent to five 8½" x 11" sheets fed in the long dimension.

Trimming may also be accomplished in association with a laminator if the product is carefully fed and registered prior to laminating. The subsequent slitting and transverse cutting operations must be performed in line and after laminating. This is an excellent method of trimming, but requires considerable sophistication and expensive hardware. Also, this approach ordinarily requires a whole new machine design incorporating trimming rather than permitting an adaptation of a conventional laminator.

An alternative approach is to trim all sides of the laminated product simultaneously with a matched set of male-female dies. This technique is straight forward but somewhat expensive. It has the further disadvantage of being limited to the originally selected cutting size as cutting dies must be designed for each cutting application.

A further cutting technique for trimming uses steel rule dies mounted in a press-like fixture and brought up against the product to be trimmed which itself is on a hard surface to "pinch-cut" the product. This approach essentially has the same disadvantages as the matched die configuration above.

Both the matched die set and steel rule die techniques have a further disadvantage in requiring considerable manual effort to cut heavier laminates used, for example, in identification cards which are .020"–.030" in thickness. Obviously, both techniques can be made automatic, but only at considerable expense.

In pinch cutting, a difficulty is that the product tends to shift or slip as the cutter engages the product. This produces inaccuracies and/or inefficient cutting. The situation is further complicated because as the cutter is stroked one way, shift may occur. On the return stroke, the cutter may cut in a new place and tends to shift the product once again. The answer to slip-shift is to hold the product down. Among the techniques used to accomplish this has been the human hand, complex vacuum devices, and inflexible and awkward mechanical clamps.

SUMMARY

In accordance with the present invention, we have provided a sheet trimming apparatus utilizing a pinch-cut technique for trimming. A cutter wheel is adapted to pass transverse to the direction of motion of a supply of smooth sheet material in a groove. A double faced tacky tape is placed adjacent the parallel to a groove in order to provide means to secure the sheet material during trimming.

In addition further embodiments of this invention providing multiple simultaneous and successive trimming of sheet material is provided.

Accordingly, it is an object of the present invention to provide a sheet trimming apparatus for a smooth sheet material.

Another object of the present invention is to provide a sheet trimming apparatus which is adjustable flexible and rapid operating.

A further object of this invention is to provide a sheet trimming apparatus which is a modification of the pinchcut technique of trimming.

Yet another object of this invention is to provide a sheet trimming apparatus of minimal size and power requirements.

Many other advantages, features and additional objects of the present invention will become manifest to those versed in the art on making reference to the detailed description and the accompanying sheets of drawings in which preferred structural embodiments incorporating the principles of the present invention are shown by way of illustrative example.

ON THE DRAWINGS

FIG. 3 is an elevational view of an alternative embodiment of sheet trimming apparatus; and FIG. 4 is a schematic view of a further alternative embodiment of the sheet trimming apparatus.

AS SHOWN IN THE DRAWINGS

Figure 1:
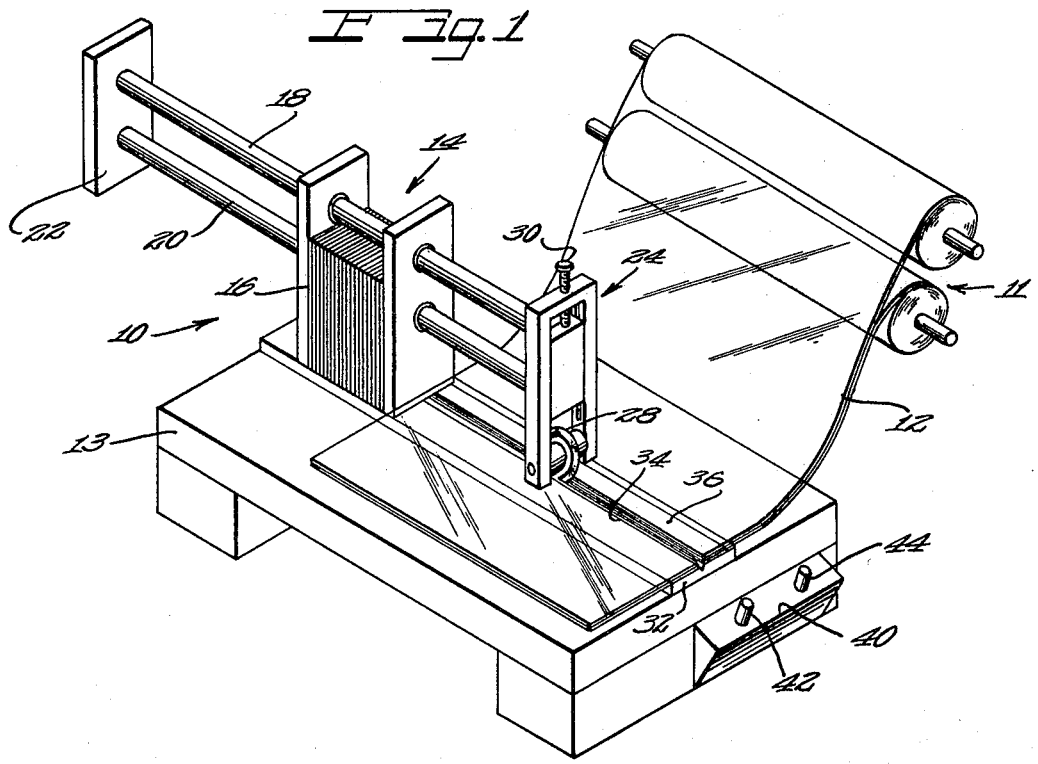
FIG. 1 is an elevational view of a sheet trimming apparatus according to the invention.

The principles of this invention are particularly useful when embodied in a sheet trimming apparatus as illustrated in FIG. 1 generally indicated by the numeral 10. The sheet trimming apparatus 10 is supplied from a film supply unit 11 with a sheet material or laminated film 12. The sheet trimming apparatus 10 is mounted on a base 13 and comprises a polynoid assembly 14 including a coil 16 and a pair of shafts 18, 20 which are secured at their ends by a plate 22 and a cutter wheel assembly 24.

The cutter wheel assembly 24 includes a rotatable wheel 28 which has a height adjusting wheel screw 30 mounted vertically above the cutter wheel 28. The cutter wheel assembly 24 is powered by the polynoid assembly 14 and adapted to pass transverse to the supply of laminated film 12 overlying a hardened plate 32 having a groove 34 therein. Adjacent to groove 34 is a means for holding the laminated film during trimming and comprises a double-faced adhesive or "tacky" surface tape 36. The sheet trimming apparatus has a control module 40 including a pair of in-out control buttons 42 and 44. The cutter wheel assembly 24 has an inverted U-shaped bracket 50 having a pair of interior slots 52 which are in sliding fit relationship with an adjusting plate 54.

The adjusting plate 54 is mounted on the shafts 18 and 20 of the polynoid assembly 14.

The cutter wheel 28 is mounted on a wheel axle 56 which is secured by a bolt 58 having a head 59 abutting a washer 60 at one leg of the bracket 50 and is engaged by threads 61 of a threaded aperture in the opposite leg of the inverted U-shaped bracket 50.

Figure 2:
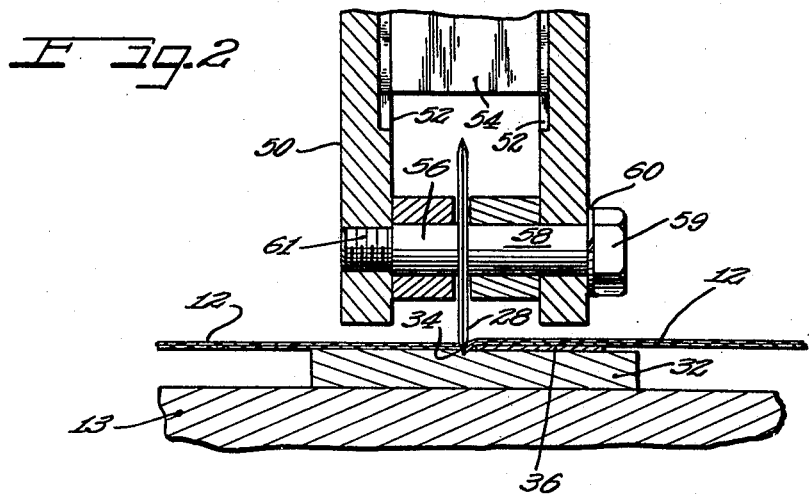
FIG. 2 is a front fragmentary sectional view of the cutting wheel and groove of the present invention.

In trimming the sheet material the cutter wheel 28 is rolled against the groove 34 in the plate 32 with essentially no clearance (FIGS. 1 and 2) to allow for the presence of the sheet material 12. The table plate 32 should be less hard than the cutter wheel 28. Preferably both the wheel 28 and plate 32 are hardened to increase their service life. Most applications require the cutter wheel 28 to exert a slight pressure against the plate 32 which encourages the development of a slight groove 34 in the surface. This groove 34 assists in making the cutter wheel 28 track in exactly the same place from one stroke to the next, including the return stroke.

The cutter wheel 28 rotates due to the friction between the plate 32 and/or the intervening sheet material 12. In effect, this amounts to a rolling pinch-cut. A useful analogy would be any friction cutting operation involving a rotating cutter.

The double faced tape 36 used with this invention is no wider than 1/16 inch and has been found to be effective in holding a product in proper position with no slip-shift during any movements of the cutter wheel 28. The best location for the tape 36 is exactly parallel and in direct abutment with the groove 34 in the hardened surface 32. The holding by the tape 36 should be done as close to the cutting action as possible.

It has been found that very little tack or holding area is required. If too much tack area is employed, difficulty is experienced in removing the product after cutting. It has been noted that the tack surface can be more advantageously used on the product side of the groove 34 only. This allows the trimmed residue of the sheet material 12 to be removed by brushing, blowing or vacuuming.

The double-faced tape 36 remains useful for thousands of operations when the sheet material 12 is smooth surfaced as is the case with all plastic films. Any sheet product can be trimmed. However, the tack hold-down feature has limited life where the tack becomes "insulated" by fibers torn from the product surface. Thousands of hold-down operations have been accomplished with the glossy side of a conventional photographic print. However, the reverse side yields fibers which limit the tack life of the tape 36 to less than a hundred operations. Clay-coated stock tacks well on a repetitive basis, but newsprint sometimes works well only one or twice. This invention contemplates the use of the double-faced tape 36 for all operations where a plurality of operations may be performed with a single piece of double-faced tape. The used up double-faced tape 36 is easily replaceable.

In operation, the sheet material 12 to be trimmed is moved into position with respect to the sheet trimming apparatus 10 such that the portion of the sheet material 12 to be trimmed overlies the groove 34 with one side of the sheet material 12 being held by the double-faced tape 36. The polynoid 14 is operated by the control button 42 being depressed to energize polynoid coil 16. This causes the polynoid assembly to be actuated with shafts 18 and 20 passing transverse to the direction of the sheet supply 11 to drive the cutter wheel 28 in the groove 34 and thereby pinch-cut the sheet material 12.

The cutter wheel assembly 24 is on the pair of shafts 18, 20 which are part of the polynoid assembly 14. A polynoid differs from a solenoid in that the moving plunger has, in effect, a continuing, long stroke whereas the stroke of a solenoid plunger is limited to the length of the solenoid coil. In effect, the polynoid is a linear motor. The indefinite stroke accomplished by the use of a polynoid enables practical design of cutting devices to accommodate typical paper and/or laminate sizes. Provisions have been made to permit heavy duty use of a cutting device by adding additional shafting and linear bearings. This aids the cutter wheel 28 in staying in the correct plane during cutting instead of deflecting in the vertical direction because of an intervening product.

Provision has been made to adjust the vertical position of the cutter wheel 28 as it gradually cuts deeper in the groove 34 of the hardened surface or hardened plate 32 by means of the height adjusting screw 30 in the inverted U-shaped bracket 50. There is enough adjustment provided in the cutter wheel assembly 24 to permit the hardened wheel 28 to "score" instead of "cut."

This embodiment of the sheet trimming apparatus utilizes one cutter wheel 28. Since only one stroke of the cutter wheel 28 is required to trim a sheet, it is possible to use the sheet trimming apparatus in selected modes of operation. For example, the trimming by the cutter wheel assembly 24 may be stroke "out" and "stop." Alternatively, the cutter wheel assembly 24 may be energized to stroke "out" and stroke "in" automatically. This is the desired mode of operation since it is advantageous to get the cutter assembly 24 out of the way of an operator by returning it to a starting position. In this embodiment, it has been noted that only 20 seconds or five seconds per side are required to position and trim a typical laminate. This is an improvement of about 30% over the conventional means described above which require a minimum of 30 seconds.

With regard to minimizing the time required to trim a laminate, this invention contemplates the use of not less than two cutters simultaneously, as in FIGS. 3 and 4, which would probably reduce cutting time to a minimum of 2.5 seconds per side and increase the trimmer output to approximately six sheets of paper or laminate per minute. A plural cutter sheet trimming apparatus is illustrated in FIG. 3 generally indicated by the numeral 100, including a pair of polynoid assemblies 104, 106 which move in parallel to operate a shaft 108 linked therebetween. The polynoid assemblies 104, 106 are secured to a base 113 and are movable on individual shafts 118 and 120. Mounted on the shaft 108 are a plurality of cutter wheel assemblies 124 which are adjustable by means of a longitudinal adjustment screw 126. Corresponding to each of the cutter wheel assemblies 124 are longitudinally adjustable plates 132 having a groove 134 therein adapted to cooperate with the cutter wheel 28.

In operation with the polynoid assemblies 104, 106 at the rearmost position of the base 100, the sheet material 12 would be inserted from the right over the plates 132.

The switch 140 is actuated to energize the coils 116 of the polynoid assemblies 104, 106 to stroke "in" and stroke "out." The polynoid assemblies when energized move simultaneously on the shafts 118 and 120 to the forward position and automatically return to the rearmost position and in so doing carry the cutter wheel assemblies 124 mounted on the shaft 108 along the plates 132 whereby the cutter wheels 28 travel in the grooves 134 to pinch-cut the sheet material 12 therebetween. A holding function is performed by a length of double backed tape 36 parallel to each of the grooves 134. Each of the trimmed sheets then is held at one end by the double backed tape 36. After the trimming, the operator picks the trimmed sheets from the machine.

This operation may be performed manually or automatically as by blown, vacuum or other suitable techniques to remove the sheets 12a, 12b, and 12c from the trimmed position, FIG. 3.

An alternative embodiment of a plural cutter assembly is shown in FIG. 4 generally indicated by the numeral 150. The plural cutter assembly sheet trimming apparatus is shown schematically having a pair of cutter assemblies 154 adapted for parallel movement and a second pair of cutter assemblies 156 adapted for parallel movement in a direction perpendicular to the direction of the first pair of cutter assemblies 154 as indicated by the arrows.

In operation, the sheet 162 would be positioned with respect to the four cutter assemblies and held in position by a double backed tape 36 on four sides which correspond to grooves in the plural cutter assembly sheet trimming apparatus 150. Cutter assemblies 154 are actuated to cut two sides of the sheet 12 and upon their return to the rearmost position, cutter assemblies 156 are energized to cut the sheet 162. This arrangement has the advantage of requiring only one positioning of the sheet 162.

Other embodiments utilizing plural cutter assemblies are also possible with the cutter assemblies being positionable as desired to cut, trim or score desired sizes of sheet material. The cutter assemblies are adjustable laterally and transversely to trim the sheet material to required sizes.

The sheet material being trimmed is secured in position by the strip of double faced tape 36 which is capable of thousands of operations with smooth surface products such as polyvinyl acetate, polyethylene, ethylene vinyl acetate, and polyvinylidene chloride (Saran).

Although minor modifications might be suggested by those versed in the art it should be understood that we wish to embody within the scope of patent warranted hereon all such embodiments as reasonably and properly come within the scope of our contribution to the art.

We claim:

1. A trimming apparatus for a smooth sheet material, having:
   (a) a cutter wheel arranged to be impressed against one face of the sheet material;
   (b) a surface on which the opposite face of the sheet material engages and having a groove defining a line along which the material is to be cut;
   (c) means to move said cutter wheel at a constant depth in said groove through the sheet material whereby the sheet material is trimmed by said cutter; and
   (d) tacky surface means adjacently alongside the groove to engage said opposite face of the sheet material and secure the sheet material against displacement during cutting by said cutter wheel.

2. A trimming apparatus according to claim 1, said means to secure the sheet material being a tape having pressure sensitive adhesive on both sides.

3. A trimming apparatus according to claim 1, said means to secure the sheet material comprising a double sided tacky tape having one side removably attached to said surface and the opposite side exposed to engage the sheet material.

4. A trimming apparatus according to claim 1, said cutter wheel tracking in said groove with substantially no clearance therebetween to pinch-cut the sheet material.

5. A trimming apparatus according to claim 1, said means to move said cutter wheel urging said cutter wheel against the bottom of said groove.

6. A trimming apparatus according to claim 1, said means to move said cutter wheel being a polynoid motor device.

7. A trimming apparatus for a smooth sheet material, having:
   (a) a cutter;
   (b) a surface along which the material is to be cut;
   (c) means to move said cutter along said surface to trim the sheet material; and
   (d) means to secure the sheet material with respect to said surface comprising a tape having pressure sensitive adhesive on both sides.

8. A trimming apparatus for a smooth sheet material, having:
   (a) a cutter;
   (b) a surface along which the material is to be cut;
   (c) means to move said cutter along said surface to trim the sheet material; and
   (d) means to secure said sheet material to said surface while it is being cut comprising a tacky surface area.

9. A trimming apparatus for sheet material, having:
   (a) a cutter wheel;
   (b) a surface with a groove defining a line along which the material is to be cut;
   (c) means adjacent the groove to secure the sheet; and
   (d) a polynoid to move said cutter wheel at a constant depth in said groove through the sheet material whereby the sheet material is trimmed by said cutter.

10. A method of trimming a smooth sheet material with a cutter wheel engageable within a groove in a surface defining a line along which the material is to be cut, the steps comprising:
    (a) applying to said surface adjacently alongside said groove a tackly material presenting a tacky side to be acted upon by said cutter wheel and placed upon said surface; and
    (b) while acting upon the material with said cutter wheel securing the material by adhering against said tacky surface against slip-shifting.

References Cited

UNITED STATES PATENTS

| | | | |
|---|---|---|---|
| 933,688 | 9/1909 | Atwood | 83—451 |
| 3,005,421 | 10/1961 | Lea | 83—577 X |
| 3,108,349 | 10/1963 | Takacs | 83—614 X |
| 3,240,093 | 3/1966 | Bell et al. | 83—614 X |
| 3,293,965 | 12/1966 | Habicht | 83—614 X |
| 3,301,117 | 1/1967 | Spaulding | 83—614 X |
| 3,319,500 | 5/1967 | Wild et al. | 83—614 X |

FOREIGN PATENTS 271,183   9/1962   Austria.

WILLIAM S. LAWSON, Primary Examiner

U.S. Cl. X.R.

83—451, 471, 487, 577, 614, 620